J. GUSTAFSON.
VEHICLE.
APPLICATION FILED MAY 28, 1920.

1,355,963.

Patented Oct. 19, 1920.

INVENTOR
John Gustafson.
BY
Theo. Stevens.
ATTORNEY

UNITED STATES PATENT OFFICE.

JOHN GUSTAFSON, OF DULUTH, MINNESOTA.

VEHICLE.

1,355,963.

Specification of Letters Patent.

Patented Oct. 19, 1920.

Application filed May 28, 1920. Serial No. 384,847.

*To all whom it may concern:*

Be it known that I, JOHN GUSTAFSON, a citizen of the United States, residing at Duluth, in the county of St. Louis and State of Minnesota, have invented certain new and useful Improvements in Vehicles, of which the following is a specification, reference being had therein to the accompanying drawing.

This invention relates to vehicles and has special reference to a four wheeled manually operated vehicle commonly referred to as a *speeder* or speed wagon.

The principal object of the invention is to produce an improved device of this nature over and above those now known in the art. Another object is to produce such a device of more open and light construction than heretofore employed. Still another object is that of novelty in attaching the rear wheels of the vehicle so that the latter are supported from both sides thereof. Other objects and advantages of the novel structure will appear in the further description of the invention.

In the accompanying drawings forming part of this application and in which like reference characters indicate like parts:

Figure 1:
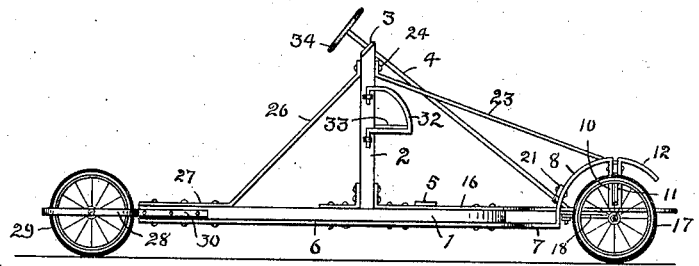
Figure 1 is a side elevation of one of my improved speeders.
Figure 2:
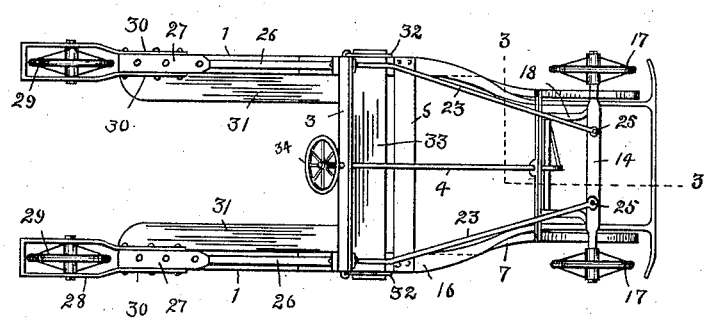
Fig. 2 is a top plan view of Fig. 1.
Figure 3:
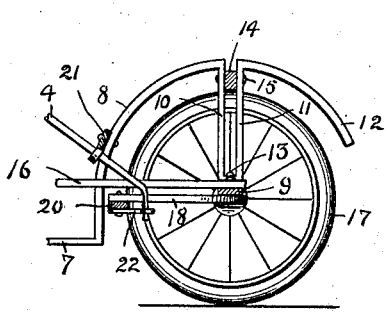
Fig. 3 is an enlarged vertical section of the forward end of the vehicle taken on the line 3—3 Fig. 2.
Figure 4:
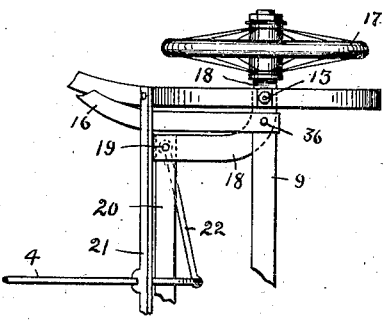
Fig. 4 is a top plan view of Fig. 3, the cross-piece 14 being omitted.

The chassis of the machine comprises two parallel spaced wooden members 1, each of which has rigidly fixed thereto and adjacent the centers thereof an upright member 2, across the top of which and spanning the space therebetween is the inclined board 3 through which the steering stem or rod 4 of the vehicle passes. Spanning the space intermediate of the members 1—1 and forward of the uprights 2 is a cross-piece or tie member 5 forming part of the chassis of the vehicle as well as acting as a foot rest when desired.

Diagonal braces, not shown, may be employed in any desired manner intermediate of the uprights 2—2.

Upon the under side of each member 1 is securely fixed a metal reinforcing strap 6, which, at the forward end, extends beyond the member 1 and is curved inwardly for a short distance as at 7, and thence upwardly in arcuate form as at 8 to a point directly over the front axle 9 of the vehicle where it is turned downwardly as at 10 to a point substantially level with the upper surface of the member 1, where it is bent backward upon itself as at 11, the two parts 10 and 11 being spaced from each other, and said portion 11 having its upper end turning in a manner to appear as an extension and of the same curvature as the portion 8, as at 12. The lower termination of the doubled portion 10 and 11 is securely fastened to the axle of the vehicle as at 13 while intermediate of the portions 10 and 11 and at the upper end thereof, is the front cross piece 14 of the vehicle, it being securely fixed at both ends intermediate of the side portions as at 15.

To the upper forward face of the members 1 is fastened a strap 16 which leads forwardly of and is curved inwardly from the side members 1, the free end of which is fastened to the front axle 9 as at 36. By this means a secure supporting means for the front axle of the vehicle is insured.

Each front wheel 17 of the vehicle is mounted upon a right angularly shaped stub axle indicated at 18 and is pivoted to the chassis as at 13, the inner manipulating ends of said stub axles being formed at substantially right angles to the wheel carrying portion, the free ends of which are pivotally attached as at 19 to the cross rod 20. As a suitable bearing for the lower end of the steering rod I have shown a cross member 21, the ends of which are connected to the arched portions 8 of the strap 6, and the lower end of the steering rod is bent downwardly, pivotally engaged in any desired manner with the end of the steering pitman 22 which is connected to one of the pivotal points 19 at the juncture of the cross rod 20 with one of the stub axles 18.

Strengthening braces or rods 23 are securely fastened at one end as at 24 near the upper end of the uprights 2 and extend downwardly and converge toward the front end of the vehicle and attach as at 25 to the cross piece 14. Similar rods 26 are fastened to the uprights 2 by the same bolts that hold the upper end of the rods 23 and their lower ends are securely fastened to the rear ends of the members 1 as at 27 forming a reinforced connection for the straps 28, in which the hind wheels 29 are journaled, said straps extending wholly about the wheels and securely bolted to the sides of the members 1 as at 30.

Running boards 31 are securely fixed to the members 1 upon the inner sides thereof and form a platform upon which the operator stands with one foot when propelling the car or rests entirely when coasting as is obvious.

Upon either side of the uprights 2 is pivotally supported a bracket 32 which carries therein a removable board seat 33, and, when said board is not employed, the brackets may be swung extending rearwardly of the members 2, opposite to the position shown in Fig. 1, and in which position they may act as hand hold means.

A suitable steering wheel 34 is attached in any desired manner to the steering rod 4 and by which the vehicle is directed as is obvious.

From the foregoing it is evident that I have devised a simple light and attractive speed vehicle of the character described.

Having thus described my invention what I claim and desire to secure by Letters Patent, is:

1. A vehicle of the character described comprising two principal spaced side members, wheels supporting the forward ends thereof, wheels supporting the rear ends thereof, two upright standards one above each of the side members, a removable seat carried by said standards and a steering wheel coöperatively engaged with the front wheels of the vehicle intermediate of the standards at the rear of the seat, substantially as described.

2. The combination with a vehicle of the class described comprising two parallel spaced side members, front and rear wheels, front axle and steering mechanism, of a bar extending from the front end of the under side of each side member to a position alongside of and above each front wheel forming a guard therefor, and a similiar bar extending from and attached to the forward upper face of each side member extending forwardly and attached to the front axle of the vehicle.

3. A vehicle of the class described the chassis of which comprises two horizontally disposed spaced wooden side members, two upright standards, a removable seat carried by said standards, braces attached to the upper end of the standards and extending downwardly and forwardly to the front of the vehicle, braces attached to the upper end of the standards and extending downwardly and rearwardly to the side members, a narrow running board or foot rest carried by each side member at the back of the standards, a steering wheel at the rear of the seat and accessible to an operator standing on one of the running boards, said steering mechanism being connected with the front wheels of the vehicle, and a rear wheel rigidly fixed to the rear end of each side member.

In testimony whereof I hereunto affix my signature in the presence of two witnesses.

JOHN GUSTAFSON.

Witnesses:
S. C. BRONSON,
S. GEO. STEVENS.